Patented Mar. 9, 1926.

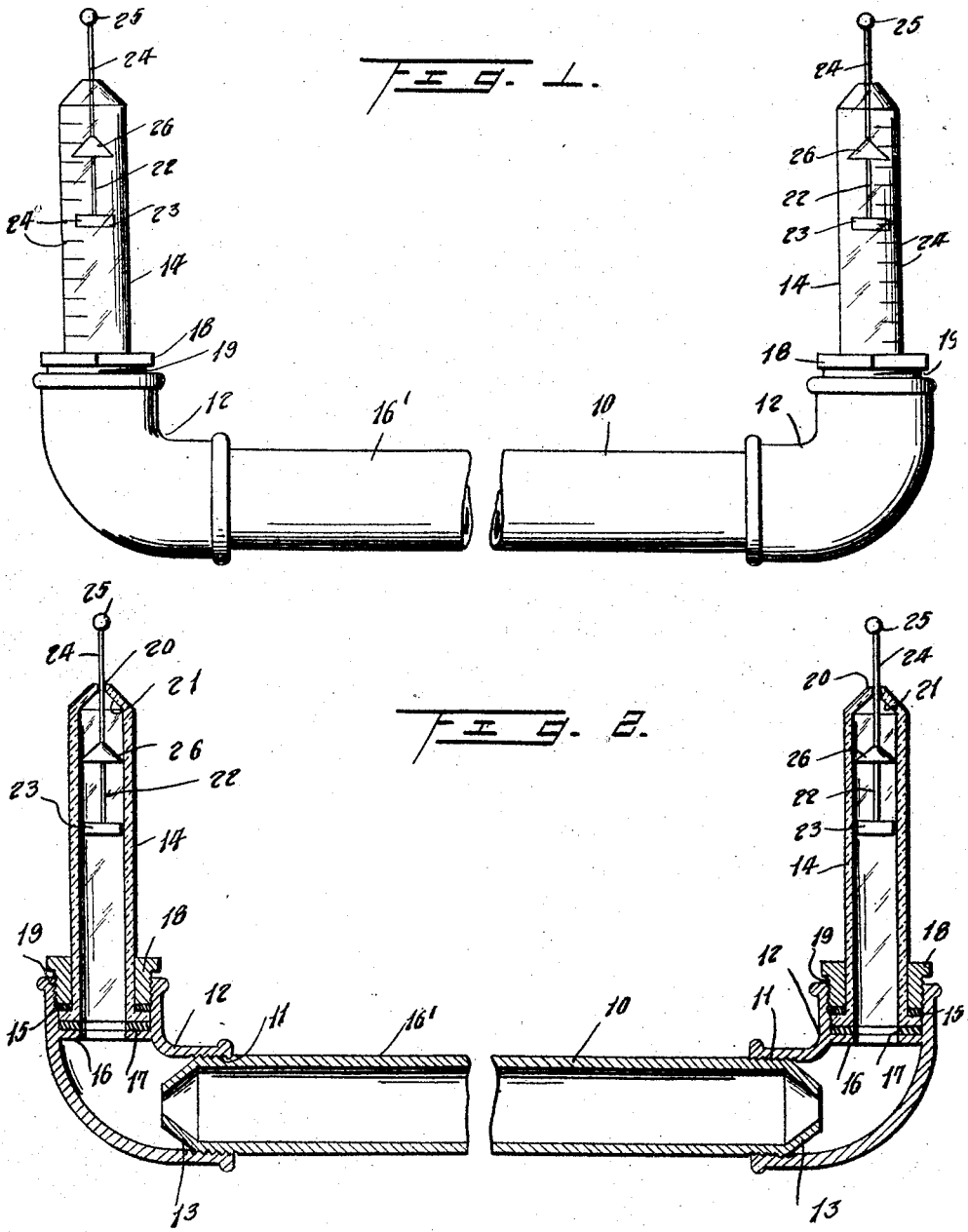

1,576,470

UNITED STATES PATENT OFFICE.

JUAN RICHARDSON, OF GOOD WATER, ALABAMA.

TERRACE LEVEL.

Application filed April 2, 1925. Serial No. 20,311.

*To all whom it may concern:*

Be it known that I, JUAN RICHARDSON, a citizen of the United States, residing at Good Water, in the county of Coosa and State of Alabama, have invented certain new and useful Improvements in Terrace Levels; and I do hereby declare the following to be a full, clear, and exact description of the invention, such as will enable others skilled in the art to which it appertains to make and use the same.

This invention relates to a level primarily adapted for use in the construction of terraces made to prevent the washing away of land.

It is aimed to provide a novel construction of level having a movable liquid adapted to control the position of the indicators.

Another object is to provide a construction wherein the indicators are arranged in parallel tubes subject to the fluctuation in the water level in the tubes, such tubes serving as vents, and the indicators having valves coacting with said vents to close them as the water rises and to open them as the water recedes to alternately close and open the vents.

The more specific objects and advantages will partly appear and otherwise become apparent from a consideration of the description following taken in connection with accompanying drawings illustrating an operative embodiment.

In said drawings:—

Figure 1 is a view of the level in side elevation; and

Figure 2 is a central vertical longitudinal sectional view.

In carrying out the invention, a metallic pipe or tube is used at 10 which in effect forms the base and at its ends is provided with interior screw threads 11 separably connecting two elbows or holders 12. The ends of the pipe or tube 10 preferably taper as at 13, as shown in Figure 2 and have their apices removed so as to provide restricted ports, to cause water or other liquid which the device is adapted to contain, to move slowly.

Indicating tubes are provided at 14 which are preferably of transparent material and usually glass. The tubes 14 at their lower ends have outwardly extending flanges 15 which are adapted to rest on inwardly extending flanges 16 within and integral with the elbow or tube-holders 12. Gaskets 17 as of rubber may be interposed between the flanges 15 and 16 to seal the joint. Gland nuts 18 may be threaded into the upper ends of the elbows or holders and engage the flanges 15 but between them a rubber or other gasket 19 is preferably used to increase the degree of sealing of the parts particularly against the escape of liquid.

The upper ends of the tubes 14 are frusto-conical so as to provide vent openings or ports 20 and valve seats 21. Suitable pistons or indicators generally designated 22 are located within the tubes 14. Such indicators comprise indicating floats in the form of disks 23 which move in operative relation to calibrations or indications 24ª delineated on the glass tubes and adapted to indicate feet in leveling, grading or graduating, particularly in connection with terraces. Floats 23 are connected to rods 24 which move in and pass through the ports 20, being of less diameter than such ports. Balls 25 may be provided on the upper end of rods 24 to prevent undue downward movement. Carried by the rods 24 and located within the tubes intermediate the disks 23 and heads 25 are conical valves 26 adapted to engage the seats 21.

The device is adapted to be filled with water or another suitable liquid in such quantity as to extend into the tubes 14 and support the floats 23.

In using the device, the pipe or base 10 is adapted to be supported on the terrace or inclination by suitable legs or in any desired manner, forming no part of the present invention and hence not being illustrated, but the device may be placed directly on the ground as desired. In order to give an idea as to the size of an instrument of this character in actual use, it may be stated that the pipe 10 for instance is about 16 feet in length. With the pipe 10 operatively arranged with respect to the terrace or incline and the tubes 14 upstanding, the liquid within the device will seek its level, thus varying the positions of the indicating disks 23 which may be considered in connection with the calibrations 24ª to thus indicate the angle. It will be realized, that as the water rises in one tube it lowers in the other tube and that when piston 22 moves upwardly sufficiently, the valve 26 engages the corresponding seat 21, thus closing the tube at its port 20. Lowering movement of the pistons accordingly permits the openings 20 to serve as vents since the air will enter therethrough. The frusto-conical terminals of the pipe 10 prevent flow or movement of the water too rapidly in the handling of the apparatus so that the apparatus will operate more precise in minimum time.

Various changes may be resorted to provided they fall within the spirit and scope of the invention.

What is claimed is:—

A level of the class described comprising an elongated tube having frusto-conical ends, elbows threaded to said tube, said elbows having internal flanges, indicator tubes in parallel relation and having flanges engaging the first mentioned flanges, nuts engaging the elbows and securing the flanges in contact, said indicator tubes having frusto-conical ends providing vent openings and valve seats, said indicator tubes, first mentioned tube and elbows being adapted to contain a liquid, floats in the indicator tubes subject to the level of the liquid, rods rising from the floats and passing through said openings, and valves on the floats to coact with said seats.

In testimony whereof I affix my signature.

JUAN RICHARDSON.